US010045167B2

(12) United States Patent
Mese et al.

(10) Patent No.: US 10,045,167 B2
(45) Date of Patent: Aug. 7, 2018

(54) PHONE RECORD

(71) Applicant: Lenovo (Singapore) Pte. Ltd., Singapore (SG)

(72) Inventors: John Carl Mese, Cary, NC (US); Nathan J. Peterson, Durham, NC (US); Russell Speight VanBlon, Raleigh, NC (US); Rod D. Waltermann, Rougemont, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/510,347

(22) Filed: Oct. 9, 2014

(65) Prior Publication Data

US 2016/0105549 A1 Apr. 14, 2016

(51) Int. Cl.
*H04M 3/42* (2006.01)
*H04W 4/16* (2009.01)
*H04M 1/656* (2006.01)

(52) U.S. Cl.
CPC ............. *H04W 4/16* (2013.01); *H04M 1/656* (2013.01); *H04M 2203/2088* (2013.01)

(58) Field of Classification Search
None
See application file for complete search history.

(56) References Cited

U.S. PATENT DOCUMENTS

2004/0203607 A1* 10/2004 Satapathy ............. H04M 1/656 455/412.1
2006/0019650 A1* 1/2006 Kedem ................. H04W 76/02 455/422.1
2010/0118158 A1* 5/2010 Boland .............. H04N 5/23203 348/211.2
2010/0198594 A1* 8/2010 Gangemi ................ G10L 13/00 704/235
2014/0012921 A1* 1/2014 Otomo .................... H04L 67/04 709/204
2014/0052330 A1* 2/2014 Mitchell ................... G06F 8/65 701/31.5
2014/0280529 A1* 9/2014 Davis ...................... H04L 67/22 709/204

OTHER PUBLICATIONS

Skyworks, Datasheet SKY77340 PA Module for Quad-Band GSM / EDGE, Oct. 17, 2006 (27 pages).
Qualcomm, Gobi. One device. Global coverage. Built-in 4G LTE. Aug. 2013 Rev. 3 (2 pages).
Android Developers, Public Class, SignalStrength, Oct. 2014 (4 pages).
Android Developers, Public Class, BatteryManager, Oct. 2014 (6 pages).
Cirrus Logic, Ultralow Power Mobile Audio and Telephony CODEC, Jul. 2013 (139 pages).

* cited by examiner

*Primary Examiner* — Moustapha Diaby
(74) *Attorney, Agent, or Firm* — Brian J. Pangrle

(57) ABSTRACT

An apparatus can include a phone that includes communication circuitry, detection circuitry that detects a communication instability, and recording circuitry that records audio responsive to detection of a communication instability.

16 Claims, 9 Drawing Sheets

PHONE RECORD

TECHNICAL FIELD

Subject matter disclosed herein generally relates to communication of information and recording information.

BACKGROUND

People use communication devices for various types of applications, which may include digital cellular network communications, Internet communications and other types of communications.

SUMMARY

An apparatus can include a phone that includes communication circuitry, detection circuitry that detects a communication instability, and recording circuitry that records audio responsive to detection of a communication instability. Various other methods, apparatuses, systems, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
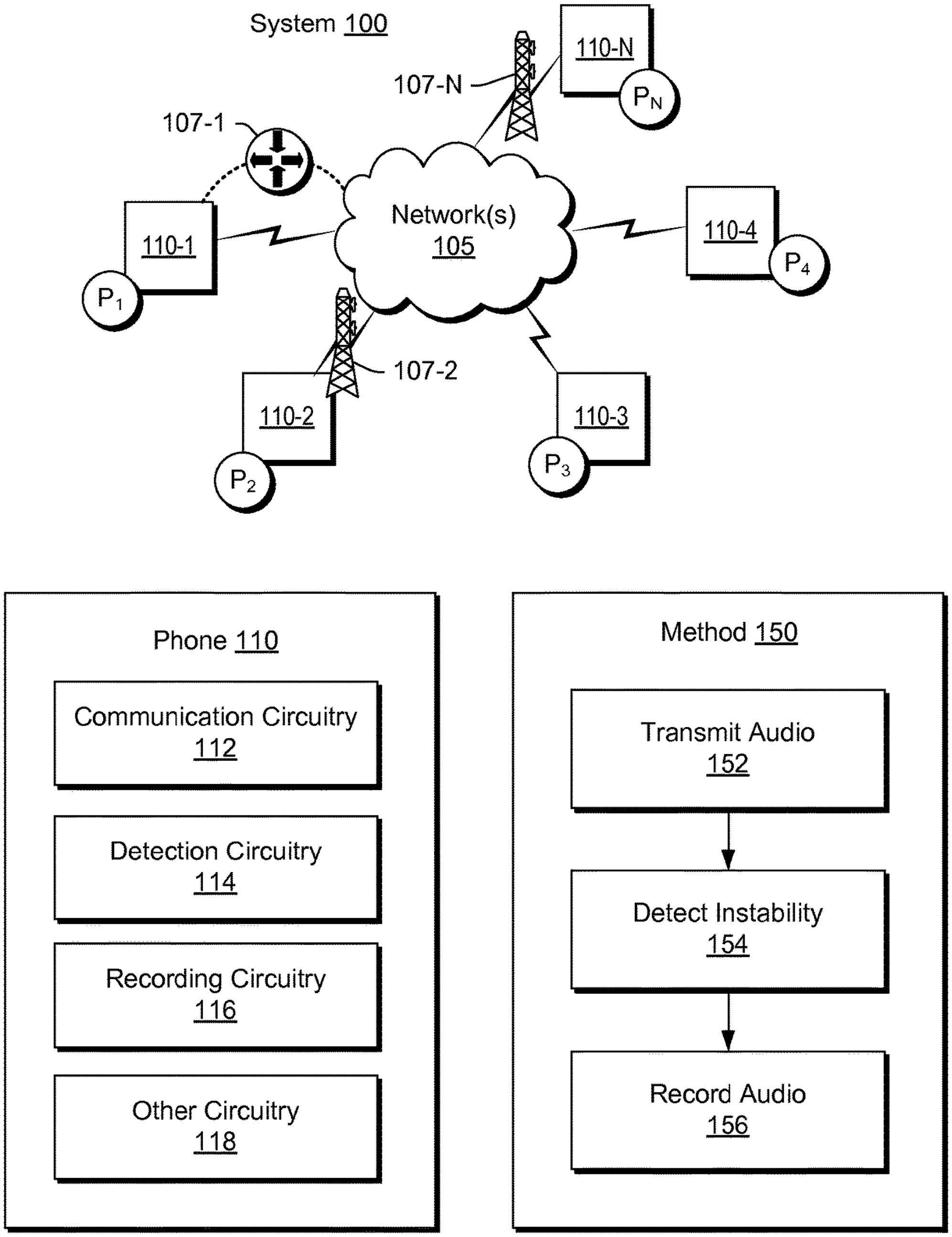
FIG. 1 is a diagram of an example of a system, an example of a device and an example of a method.

FIG. 1 shows an example of a system 100 that includes one or more networks 105 and optionally one or more types of network equipment 107-1, 107-2 to 107-N. As shown, various phones 110-1, 110-2, 110-3, 110-4 to 110-N may operatively couple to one or more of the one or more networks 105, for example, via wire and/or wirelessly.

As shown in FIG. 1, the phone 110-1 is associated with a person $P_1$, the phone 110-2 is associated with a person $P_2$, the phone 110-3 is associated with a person $P_3$, the phone 110-4 is associated with a person $P_4$ and the phone 110-N is associated with a person $P_N$. $P_1$ to $P_N$ may be people such as users of the respective devices. A person may have an account established with a device, a service or services, etc. For example, a phone may be associated with an account holder (e.g., a person, a business, etc.) that includes an account with a phone number and, for example, an email address and optionally one or more other addresses, etc. As an example, $P_1$ to $P_N$ may be associated with one or more user accounts that may be for digital cellular network use, Internet use, etc. As an example, $P_1$ to $P_N$ may be identified by identifier information, which may be a set of identifier information. For example, consider $P_2$ as having a name, a phone number, an email, a user name for a social network application, etc. Such information may be a set of identifier information. Given such a set, an algorithm may associate the information such that one piece of information can retrieve or access the entire set of information. For example, consider a relational database that includes the information or other type of data structures, algorithms, etc. that can associate the information (e.g., object database, etc.). As an example, a phone may include a contacts database that associates information about a contact (e.g., person or other entity, etc.).

In FIG. 1, as an example, $P_1$ may use the phone 110-1 to place a voice call to $P_N$, where the voice call is routed to the phone 110-N of $P_N$ via at least one of the one or more networks 105 (e.g., optionally via one or more of the pieces of equipment 107-1, 107-2, to 107-N). The phone 110-N can include notification circuitry that alerts $P_N$ of the voice call, which may then be "answered", for example, by receiving a signal that causes the phone 110-N to connect to the voice call initiated by the phone 110-1.

As an example, one or more the phones 110-1, 110-2, 110-3, 110-4 to 110-N may include circuitry such as the circuitry represented by the block diagram of the phone 110. As shown, the phone 110 may include communication circuitry 112, detection circuitry 114, recording circuitry 116 and other circuitry 118. In such an example, the detection circuitry 114 can detect a communication instability and the recording circuitry 116 can record audio responsive to detection of a communication instability by the detection circuitry 114. As an example, a communication instability may be associated with the communication circuitry 112 of the phone 110, communication circuitry of another phone, communication circuitry of one or more networks, power circuitry that may power communication circuitry, etc.

FIG. 1 also shows an example of a method 150 that includes a transmit block 152 for transmitting audio via communication circuitry of a device (e.g., a phone, etc.); a detection block 154 for detecting a communication instability; and a record block 156 for recording audio via recording circuitry of the device, for example, responsive to detection of the communication instability.

As an example, detection circuitry may receive information (e.g., data, a signal, etc.) that may be, directly or indirectly, indicative of a communication instability (e.g., a lack of communication stability). In such an example, the detection circuitry may issue a signal that calls for recording of audio by recording circuitry. As an example, recording circuitry may be local to a device and/or optionally remote from a device (e.g., consider an allied device, etc.).

As an example, when a call gets dropped (e.g., a type of communication instability), one or more of the users that were "parties" to the call may continue speaking without one or more of the other parties being connected. In such an example, a realization may occur that at least some of the conversation was lost (e.g., as to one or more parties that were at least a listener to the call).

As an example, during a call, there may be a speaker and a listener or a speaker and listeners, the roles of which may change over time of the call. For example, one person may be a speaker and then a listener while another person is a listener and then a speaker. As an example, a listener may listen quietly such that if a call drops, the speaker may not be expecting to receive via an earpiece, etc. of her phone a level of sound that may indicate that the listener is still connected to the call. In such an example, the speaker may continue to speak until at some point in time the speaker realizes that the call dropped and that some uncertainty may exist as to what the listener actually heard (e.g., what spoken words, etc. actually were successfully communicated to the listener).

In the example of FIG. 1, one or more of the phones 110-1, 110-2, 110-3, 110-4 and 110-N may detect when a voice call is dropped or is about to drop. For example, consider the block diagram of the phone 110 where the detection circuitry 114 may detect a communication instability indicative of signal loss, risk of loss, pending loss, etc. In such an example, where detection occurs, the recording circuitry 116 of the phone 110 may respond by recording audio. For example, the recording circuitry 116 may record local audio of a user of the phone 110.

As an example, recording may optionally be triggered, at least in part, where the user of the phone 110 continues speaking, which can be an indication that the user has not realized that a voice call may have dropped. For example, a phone may include logic such that recording occurs upon detection of a communication instability and where local audio is indicative of a user continuing to speak into the phone (e.g., recording conditional upon an instability condition and upon a condition that a user is still speaking).

As an example, a user may continue speaking where some uncertainty exists as to what audio is actually making it through to one or more listeners. For example, a user may make an assumption that, perhaps, some or a majority of his words are being properly communicated. As an example, consider a “crackly” call with crackling noises where a user continues to speak with the assumption that his words are being reproduced at the other end of the call. In such an example, crackling may be detected by detection circuitry, which may, for example, trigger recording of audio.

As an example, a phone may record and/or transcribes local audio upon detection of a connection failure where the local audio corresponds, at least in part, to a local user’s voice. As an example, one-sided recorded content of a user’s voice associated with a faulty voice call may be rendered to a display of the user’s phone as part of a notification, which may optionally be repeated until the user realizes that the voice call has dropped (e.g., and/or the user stops speaking). In such an example, a halt as to audio being received by a microphone or microphones of the user’s phone may be an indication that the user has realized that the voice call is faulty (e.g., the voice call dropped).

As an example, recorded content can serve as a way to know what was being discussed and at what point in a conversation a voice call stopped (e.g., with respect to one or more parties to the voice call). In such an example, the recorded content may help to avoid a “what was the last thing you heard?” question to a listener or listeners.

As an example, at least a portion of recorded content may optionally be sent in a form such as, for example, a message (SMS, email, etc.). As an example, recorded content may be sent as text, an audio file, etc. As an example, a phone may include circuitry that can communicate via a digital cellular network and optionally via the Internet. As an example, a phone may include memory that stores contact information for individuals where such information may include phone numbers and one or more of email addresses, SKYPE® service names, IM service names, etc. As an example, recorded content may be transmitted via a network interface to one or more of an email address, a SKYPE® service name, an IM service name, etc., which may be associated with a phone number (e.g., or phone numbers).

As an example, the method 150 of FIG. 1 may continue to another transmit block that transmits the recorded audio of the record block 156. As an example, the method 150 of FIG. 1 may continue to a transcribe block that transcribes the recorded audio of the record block 156 to text. As an example, the method 150 of FIG. 1 may include an audio-to-text block that converts audio to text, optionally as audio is being received locally via a microphone of a phone.

As an example, recording circuitry may record audio of a local speaker, for example, without recording audio received by the device via a communication network as may be associated with a person or persons speaking at a remote location. As an example, a device such as a phone may include an option to select recording of local audio of a speaker as received via a microphone only. As an example, such an option may be a default option, a regional option, a user selectable option, etc. As an example, such an option may act to record in a manner that complies with one or more law, regulations, etiquettes, etc. For example, various types of federal and state wiretapping laws may act to limit a phone user’s ability to record both parties to a phone call. Such laws may expose a user to risk of criminal prosecution and potentially give an injured party a civil claim for damages.

From a legal standpoint, one question in the recording context may be whether one must get consent from one or all of parties to a phone call before recording it. As an example, a phone may include a permissions database that may store, for example, permissions given by one or more people. As an example, a contacts database of a phone may include a permissions field that can indicate whether a contact has given permission or not as to whether recording of a phone call that includes that contact is permitted or not. As an example, a law (e.g., a wiretapping statute, etc.) may permit recording if one party (including oneself) to a phone call; whereas, some laws may require that all parties to a communication (e.g., a phone call, etc.) consent.

As an example, a device such as a phone may include a regional database that includes information as to laws, regulations, etiquettes, etc. In such an example, a region or regions of parties to a call may be received and used to retrieve information from such a regional database. In response, the device may issue a notice, alter a setting or settings, etc. in an effort to comply or prompt a user or users to comply with a law, a regulation, an etiquette, etc. As an example, a default setting of a device may be to record local audio only, for example, the voice of a user of the device. In such an example, where the user wishes to send a recording, a transcript, etc. to another, permission may be inferred by actual sending thereof.

As an example, a phone may include notification circuitry that notifies a user that a recording has been made of the user’s voice responsive to detection of a communication instability. In such an example, the phone may allow the user to select one or more options as to what to do with the recording. For example, the user may say “delete” and the phone may delete the recording. Or, for example, the user may say “send” and the phone may send the recording to an address, a number, etc., which may be associated with one of the phone numbers of a participant in the voice call that experienced the communication instability. As an example, a phone may render a graphical user interface to a touchscreen display where a user may select an option as to a recording (e.g., recorded content). As an example, an option may be to transcribe the recording to text and then, for example, transmit the text to an address, etc.

Figure 2:
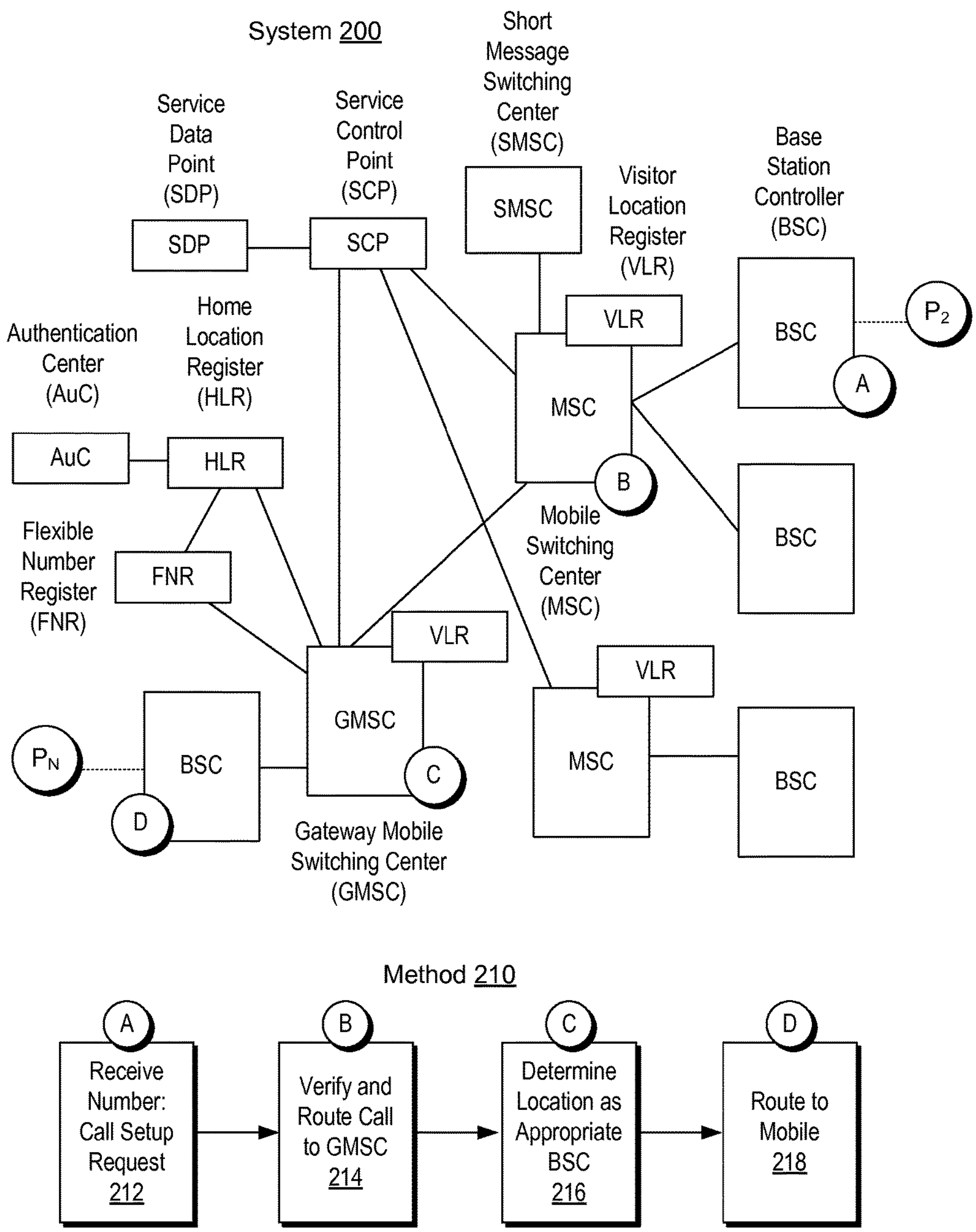
FIG. 2 is a diagram of an example of a system and an example of a method.

FIG. 2 shows an example of a system 200 and an example of a method 210 that are illustrated with respect to events A, B, C and D and with respect to $P_2$ and $P_N$ of FIG. 1, which may have phones 110-2 and 110-N, for example, each including a respective subscriber identification module (SIM). A SIM is an integrated circuit that securely stores an international mobile subscriber identity (IMSI) and a related key used to identify and authenticate subscribers on mobile telephony devices (e.g., mobile phones, tablets, computers, etc.). As an example, a SIM may store a number of SMS messages and phone book contacts. For example, such information may be stored in "name and number" pairs. As an example, a policy engine may be implemented in part using a SIM. As an example, a satellite network (e.g., Iridium, Thuraya and Inmarsat's BGAN) may be configured for use with SIMs and may be operable in a Global System for Mobile Communications (GSM) enabled device and may allow a GSM customer to roam in one or more satellite networks via use of the SIM in a satellite network enabled device.

In the example of FIG. 2, a BSC is a base station controller, a VLR is a visitor location register, a HLR is a home location register, a MSC is a mobile switching center, a SMSC is a short message switching center, a GMSC is a gateway mobile switching center, a FNR is a flexible number register and an AuC is an authentication center. As shown, the method 210 includes a reception block 212 that receives a number to initiate a call setup request (see "A"), a verification and routing block 214 that verifies and routes a call to the proper GMSC (see "B"), a determination block 216 that determines a location as associated with a proper BSC (see "C"), and a routing block 218 that routes the call to the proper mobile (see "D").

In the system 200, the various VLRs are databases that include information about subscribers roaming within a MSC location area. A VLR can act to minimize the number of queries that MSCs have to make to an HLR, which includes data regarding a cellular network's subscribers. The kind of data (e.g., fields) stored in a VLR may be akin to those stored in an HLR. For example, a VLR may store the international mobile subscriber identity (IMSI) and the mobile subscriber integrated services digital network (MSISDN), the services allowed for a particular IMSI/MSISDN pair, and authentication data, all of which correspond to a particular subscription (e.g., account). When a subscriber moves into an MSC's location area, a corresponding record is updated in the VLR. Subsequently, the subscriber's HLR is automatically informed of the change.

As to the SMSC, it may implement a short message service as a mechanism of delivery of short messages over mobile networks. Such an approach may be a store and forward way of transmitting messages to and from devices with appropriate network interfaces. As an example, a message (e.g., text) from a sending device can be stored in the SMSC which may forward it to a destination device. In such a system, in the case that the recipient is not available, the short message may be stored and sent later. For example, consider a transcription of audio of a user of a phone that was party to a call with another when the call dropped, which may have been due to a fault with a user's phone at the other end of the call or another type of communication instability. In such an example, the transcription may be send as one or more text messages, which may be stored in a storage such as the SMSC and then forwarded to the phone that was at the other end of the call. As an example, a short message may adhere to a specification, for example, to a character length of 160 characters where such characters may be text (alphanumeric) or binary non-text short messages. As an example, SMS messages may be sent/received simultaneously with voice/data/fax service over a GSM network.

As an example, the system 200 can include cell sites (e.g., cell towers), which may be referred to as a base station or base transceiver station (BTS). A cell site can include antennae and electronic communications equipment that may be placed on a radio mast, tower or other place to create a cell (e.g., or adjacent cells) in a cellular network. A BTS may include a BSC or may be operatively coupled to a BSC.

As an example, a phone may not work at times, for example, because it is too far from a cell site, because the phone is in a location where signals are attenuated by thick building walls, hills or other structures. While signals do not require a clear line of sight, greater radio interference tends to degrade or even eliminate reception. As an example, issues may arise when many people try to use a cell site at the same time (e.g., consider a traffic jam, a sports event, etc.). In such an example, a phone may display an indicator of sufficient signal, however, starting a new connection may be problematic. Another limiting factor for phones can be the ability to send a signal from a phone that is low on power (e.g., low battery power) to a cell site.

Another scenario arises for a traveling phone or traveling phones. For example, consider one or more parties to a connection being in vehicles. In such an example, a base station controller and phone communication circuitry may keep track of and allow a phone to switch from one cell site to another cell site during a conversation. For example, as a user moves towards a cell site, the phone may select the strongest signal and release the current cell site from which the signal has become weaker.

As an example, a phone may include communication circuitry that can support one or more communication bands. For example, consider CDMA bands (e.g., 800 and 1900 MHz), GSM bands (e.g., 850, 900, 1800 and 1900 MHz) and UMTS bands (e.g., 850, 900, 1900, 2100 MHz). As an example, communication circuitry may be operable via a plurality of bands, for example, to work across one or more US carrier network and/or one or more non-US carrier networks.

Figure 3:
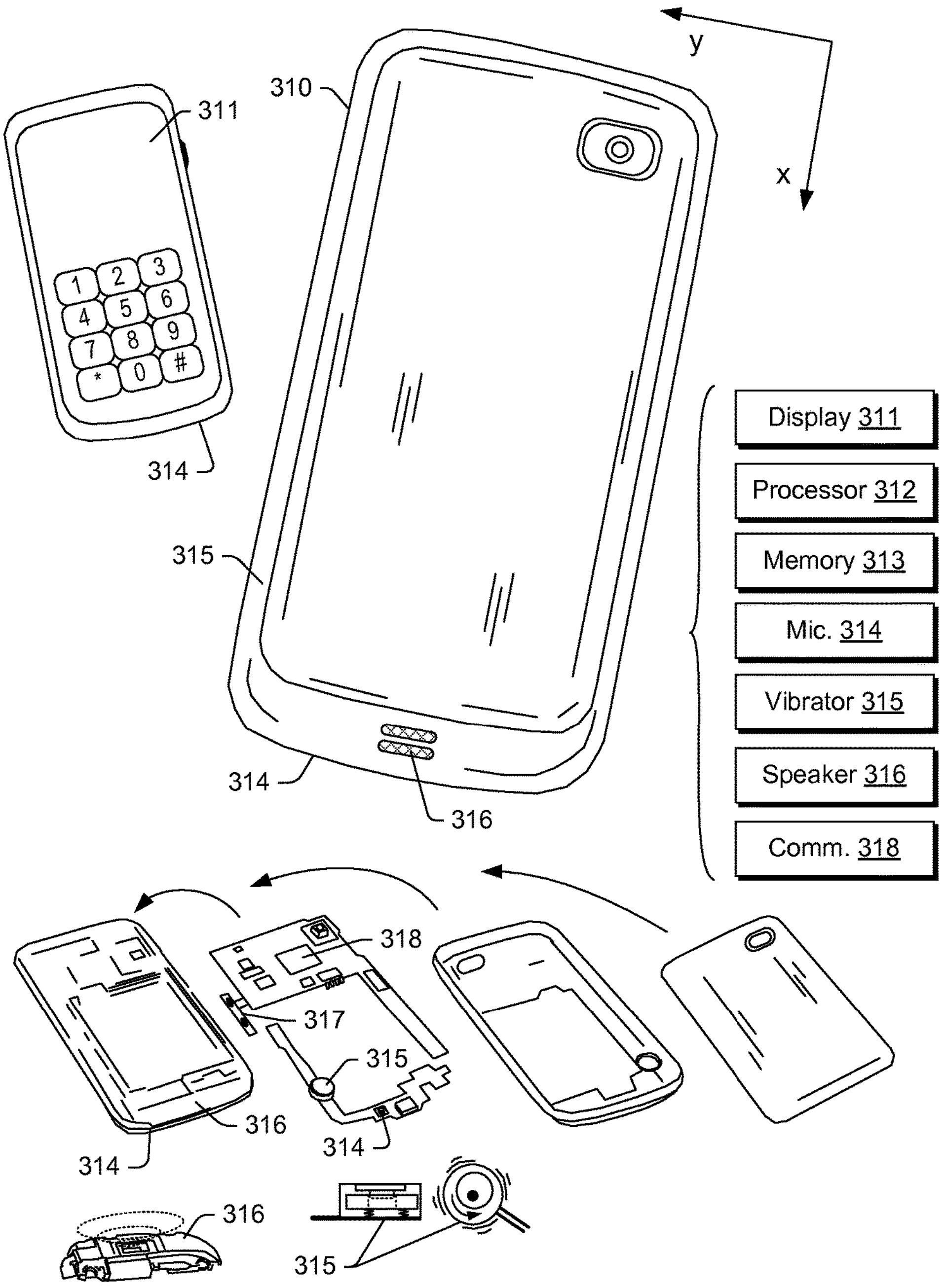
FIG. 3 is a diagram of an example of a phone.

FIG. 3 shows an example of a phone 310 that includes a display 311, which may be a touch display (e.g., a touchscreen display) for input of information (e.g., via a key pad, control graphics, etc.) and output of information (e.g., with a resolution of about 1280×720 pixels and/or a density of about 300 pixels per inch). As shown, the phone 310 includes various components such as a processor 312, memory 313 operatively coupled to the processor 312, a microphone 314, a vibrator 315, a speaker 316, a volume controller 317 and communication circuitry 318. In such an example, the communication circuitry 318 may include an antenna and/or may be operatively coupled to an antenna or antennas.

As an example, a device such as the phone 310 may include a battery bay, display graphics circuitry (e.g., optionally including touch and gesture circuitry), a camera (e.g., configured for capturing still images, video, etc.), optionally auto-focus circuitry, optionally a flash for flash photography/videography, a SIM slot, a main processor, audio circuitry (e.g., optionally including recording circuitry, etc.), power management circuitry, motion processing circuitry (e.g., accelerometer, gyroscope), modem circuitry, pressure sensor circuitry, multi-band power amplification circuitry, memory (e.g., SDRAM, etc.), wireless LAN circuitry, smart card circuitry, transmitter circuitry, ambient light sensing circuitry, and GPS circuitry. As an example, a device such as the phone 310 may include voice recognition circuitry (e.g., speech recognition circuitry), for example, as a feature for input of phone numbers, contact names, etc. As an example, the phone 310 may include speech to text conversion circuitry (e.g., as a type of speech recognition circuitry).

Figure 4:
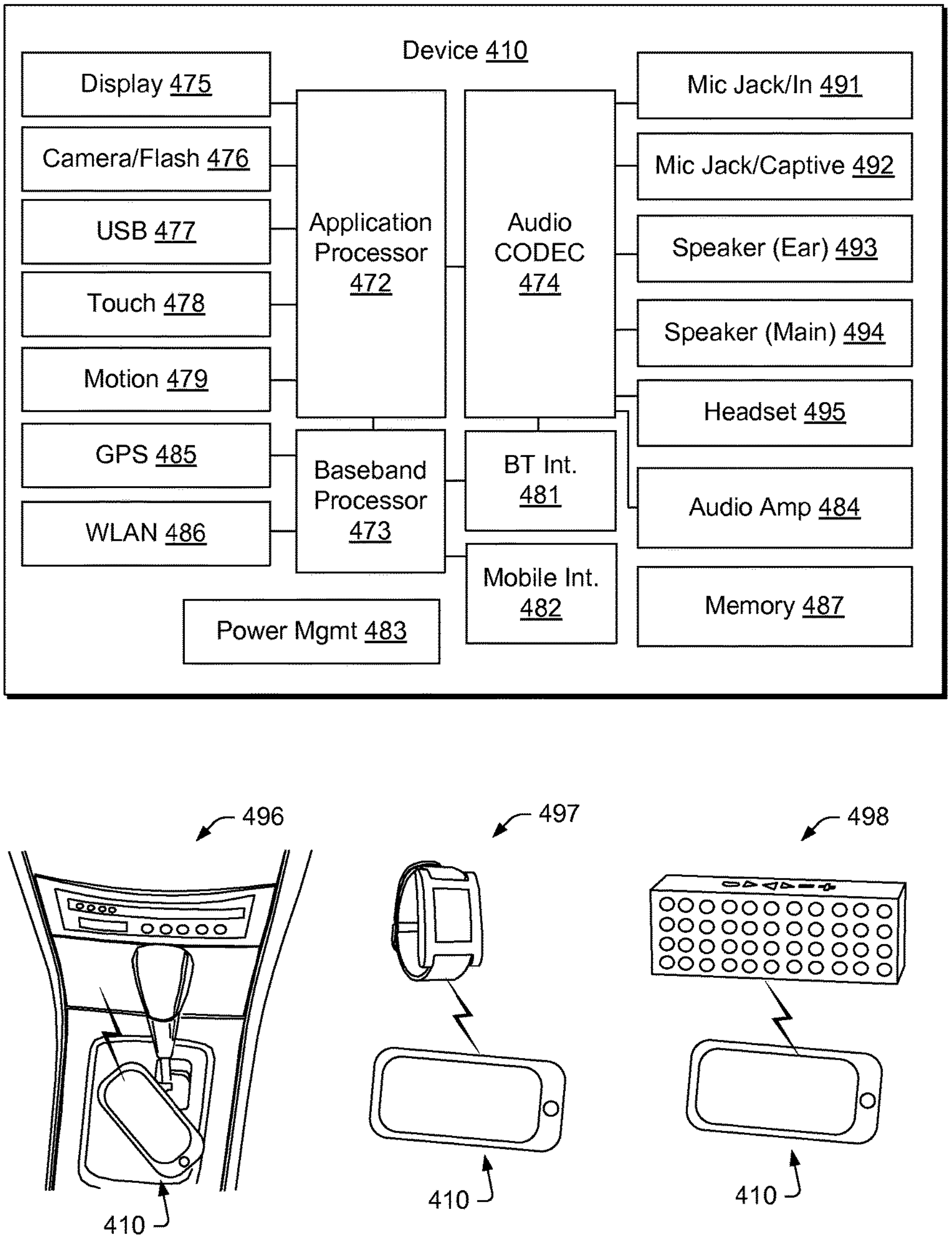
FIG. 4 is a diagram of an example of a device and examples of allied devices.

FIG. 4 shows an example of a device 410 and examples of devices 496, 497 and 498 (e.g., allied devices) that may locally "pair" with the device 410, which in the example of FIG. 4, may be a phone. As shown in FIG. 4, the device 410 can include an application processor 472, a baseband processor 473, an audio codec 474, a display 475 (e.g., including display driver circuitry), a camera/flash sub-system 476, a USB port 476, touch sensing circuitry 478, motion sensing circuitry 479, BLUETOOTH® circuitry 481, mobile circuitry 482, power management circuitry 483, audio amplification circuitry 484, GPS circuitry 485, WLAN circuitry 486, memory 487, a microphone jack in 491, a captive microphone 492, a captive speaker 493, one or more additional speakers 494, and headset out/circuitry 495. Various types of interfaces may exist between circuitry of a device such as the device 410. As an example, consider an $I^2S$ interface, which may, for example, operatively couple the application processor 472 and the audio codec 474; the baseband processor 473 and the audio codec 474; and the BLUETOOTH® circuitry 481 and the audio codec 474.

As an example, the audio codec 474 may include an integrated, low-power smart audio codec that can serve as a mobile audio distribution network incorporating multiple digital/analog converters (DACs) and an ADC, for example, with ground centered headphone, line and speaker amplifiers for smartphone and portable applications. As an example, the audio codec 474 may include recording circuitry that can record and/or process audio signals, for example, as received via a microphone (see, e.g., the microphone jack/in 491, the capacitive microphone 492, etc.). As an example, the audio codec 474 may include detection circuitry that can detect a communication instability. For example, where noise (e.g., crackling, a click or clicking, etc.) is present during a phone call (e.g., or upon dropping of a phone call), the audio codec 474 may include a detection algorithm that can detect such noise and, for example, a level, persistency, etc. of the noise, which may be indicative of a communication instability. In such an example, the algorithm may include an ability to classify a noise or noises with a type or types of communication instabilities.

As an example, an audio codec may include three asynchronous bidirectional serial ports with integrated asynchronous sample rate converters (ASRCs) that may accept a range of incoming audio sample rates, for example, to feed an integrated digital mixing engine. Such an engine may be configured to overlay (e.g., optionally simultaneously) and distribute digital audio from multiple sources to one or more its integrated audio nodes, for example, to provide routeability within an electronic device.

As an example, circuitry can include a digital mixer that can mix and route inputs (e.g., analog inputs to ADC, digital microphone, serial ports, etc.) to outputs (e.g., DAC-fed amplifiers, serial ports, etc.). As an example, a digital mixer may include features for independent attenuation on individual mixer input for individual output. As an example, processing along one or more output paths from a digital mixer to one or more DACs can optionally include volume adjustment and, for example, mute control. As an example, a peak-detector may be implemented to automatically adjust one or more volume levels via a programmable limiter. As an example, circuitry such as audio codec circuitry may be controllable via one or more busses. For example, consider an $I^2C$ bus that may be coupled to an $I^2C$ interface of audio codec circuitry such that the audio codec circuitry may respond to instructions executed by a processor (e.g., according to one or more applications, etc.). As an example, media player circuitry may include audio codec circuitry. As an example, media player circuitry may include an application executable via a processor that can instruct circuitry such as audio codec circuitry.

As an example, circuitry such as audio codec circuitry may operatively couple with wireless communication circuitry, for example, to communicate audio (e.g., and voice) data to and from components such as, for example, an application processor, a BLUETOOTH® transceiver, a cellphone modem, AIRPLAY™ circuitry (Apple Inc., Cupertino, Calif.), etc.

$I^2S$, also known as Inter-IC Sound, Integrated Interchip Sound, or IIS, is an electrical serial bus interface standard that can be implemented for operatively coupling one or more digital components with respect to audio information. For example, it may be implemented to communicate PCM audio data between integrated circuits in an electronic device. The $I^2S$ bus can separate clock and serial data signals, which may result in a lower jitter compared to communications techniques that recover the clock from a data stream.

As an example, the device 410 may record audio received via the microphone jack in 491, the captive microphone 492, etc. As an example, the device 410 may record audio received via the BLUETOOTH® circuitry 481 (e.g., or other circuitry).

As shown in FIG. 4, the device 496 that may be paired with the device 410 can be circuitry of a vehicle, the device 497 that may be paired with the device 410 can be a wearable device such as, for example, a watch, and the device 498 that may be paired with the device 410 can be a non-wearable type of device, which may optionally be a mobile device (e.g., battery powered, etc.). As an example, a device, whether wired and/or wirelessly coupled to the device 410, may include a microphone that can provide audio input to the device 410.

As an example, the device 496, the device 497 and the device 498 may include detection circuitry and/or recording circuitry. As an example, where a communication instability exists for the device 410, the device 496, the device 497 or the device 498, may respond by recording audio (e.g., where the device 496, the device 497 or the device 498 includes a microphone or is operatively coupled to a microphone). In such an example, the communication instability may be a lack of power of the device 410. For example, where a user uses an allied device operatively coupled to a phone, where the phone loses power, the user may be unaware of such a condition. As an example, an allied device may record audio responsive to detection of a communication instability where such an instability may be a result of a condition unrelated to a user's phone and/or a result of a condition of the user's phone.

As an example, a device that is paired to a phone for communication of information may be a wearable device or other device, which may include one or more of a microphone, detection circuitry and recording circuitry.

Figure 5:
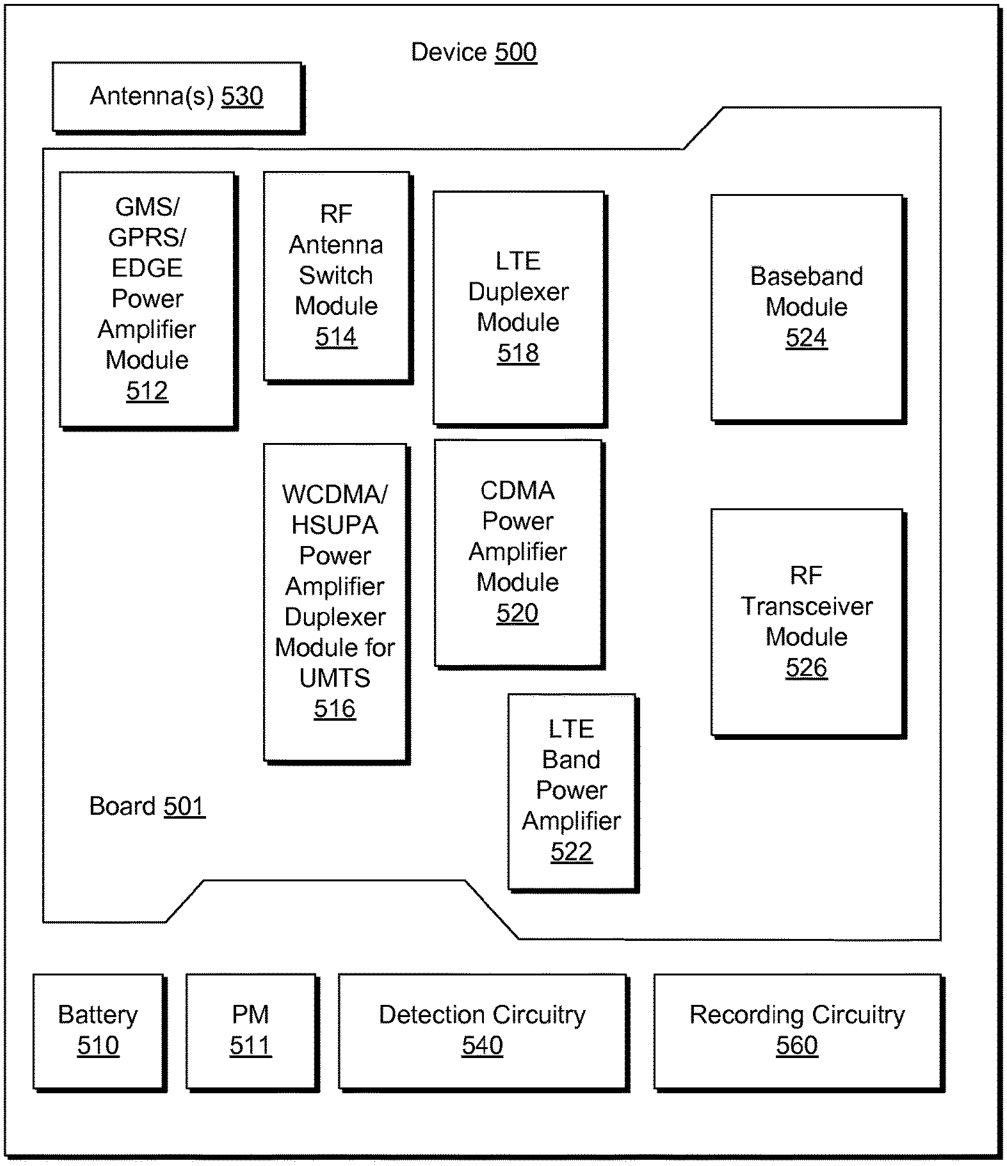
FIG. 5 is a diagram of an example of a device.

FIG. 5 shows an example of a device 500 that includes a board 501, a battery 510, a power management module 511, examples of modules 512, 514, 516, 518, 520, 522, 524 and 526, one or more antennas 530, detection circuitry 540 and recording circuitry 560. In the example of FIG. 5, the device 500 may be a phone. As shown in FIG. 5, the modules include a GSM/GPRS/EDGE power amplifier module 512, an RF antenna switch module 514, WCDMA/HSUPA power amplifier/duplexer module for UMTS band 516, a dual-band LTE B1/B3 PA+FBAR duplexer module 518, a CDMA power amplifier module 520, a LTE band power amplifier 522, a baseband modem module 524 and a RF transceiver module 526.

As an example, a baseband modem module may be a chip that provides for multi-spectrum, multi-mode LTE support. Such a chip may be capable of simultaneous voice and data transfer. As an example, a RF transceiver module may be a chip that provides multi-band/mode RF support (e.g., UMTS bands, LTE bands, EDGE bands, etc.).

As an example, a power amplifier module such as a GSM power amplifier module 512 may include multi-function control (MFC) that provides envelope amplitude control in GMSK mode, reducing sensitivity to input drive, temperature, power supply, and process variation. As an example, in an EDGE mode, such a MFC may configure a power amplifier for fixed gain and provides the ability to optimize power amplifier bias operation at different power levels. Such a module may regulate power amplifier bias conditions, for example, reducing sensitivity to temperature, power supply, and process variation. As an example, a module may include an enable input pin that can enable a standby state, for example, to minimize battery drain.

In the example of FIG. 5, the detection circuitry 540 may receive information from one or more of the battery 510; the power management module 511 (e.g., consider a power management integrated circuit (PMIC)); one or more of the modules 512, 514, 516, 518, 520, 522, 524 and 526; and the one or more antennas 530. In such an example, the detection circuitry 540 can, based at least in part on received information, detect a communication instability. In response, the detection circuitry 540 may issue a signal to the recording circuitry 560 to initiate recording of audio as received via a microphone or microphones (see, e.g., the various inputs, which may be wired or wireless, of FIG. 4). As an example, an allied device such as one of the devices 496, 497 and 498 of FIG. 4 may include detection circuitry and/or recording circuitry such as the detection circuitry 540 and/or the recording circuitry 560. As an example, detection circuitry may include receiving information from one or more modules such as one of the modules of the board 501 of FIG. 5 and/or receiving information via circuitry such as audio codec circuitry (see, e.g., the audio codec 474 of FIG. 4). As an example, audio codec circuitry may include detection circuitry and recording circuitry and audio codec circuitry may receive information from communication circuitry such as one or more of the modules of the board of FIG. 5.

As an example, a communication instability may be detected based on information such as antenna information, battery information, audio codec information, amplifier information, modem information, etc.

As an example, where an antenna exhibits low signal strength or an instable pattern, which may include high signal strength, detection circuitry may detect such a condition or conditions and decide whether a communication instability exists. As an example, signal strength information may be received via one or more modules that may be associated with processing a signal received via one or more antennas. As an example, an amplifier may provide information as to how much amplification is being applied to a signal received via one or more antennas.

As an example, detection circuitry may receive information germane to signal strength, optionally via an API of an operating system of a phone. For example, consider a Get Signal Strength API call in an iOS operating system environment that can return a signal strength. As an example, in an ANDROID® operating system environment, a SignalStrength public class may be used to access signal related information. As to some SignalStrength class examples, consider the following: getCdmaDbm( ) (e.g., get the CDMA RSSI value in dBm); getCdmaEcio( ) (e.g., get the CDMA Ec/Io value in dB*10); getEvdoDbm( ) (e.g., get the EVDO RSSI value in dBm); getEvdoEcio( ) (e.g., get the EVDO Ec/Io value in dB*10); getEvdoSnr( ) (e.g., get the signal to noise ratio); getGsmBitErrorRate( ) (e.g., get the GSM bit error rate (0-7, 99) as defined in TS 27.007 8.5); getGsmSignalStrength( ) (e.g., get the GSM Signal Strength, valid values are (0-31, 99) as defined in TS 27.007 8.5).

As an example, a device such as a phone may include circuitry that calculates signal strength, for example, as a metric or metrics. As an example, a metric may be an Arbitrary Strength Unit (ASU) that is an integer value proportional to the received signal strength measured by a device. A device may measure signal strength in dBm (e.g., and thereby power in watts) via an equation, which may differ depending on network type. As an example, in a GSM network, ASU maps to a received signal strength indicator (RSSI): $dBm=2\times ASU-113$, ASU in the range of 0 . . . 31 and 99 (for not known or not detectable). As an example, in a UMTS network, ASU maps to received signal code power (RSCP): $dBm=ASU-116$, ASU in the range of −5 . . . 91 and 255 (for not known or not detectable). As an example, in an LTE network, ASU maps to reference signal received power (RSRP): the valid range of ASU is from 0 to 97 and for the range 1 to 96, ASU maps to $(ASU-141)\leq dBm<(ASU-140)$ while the value of 0 maps to RSRP below −140 dBm and the value of 97 maps to RSRP above −44 dBm.

As indicated above, information such as signal strength, signal to noise ratio, bit error rate, etc. may be available to detection circuitry. As an example, one or more of signal strength, signal to noise ratio and bit error rate may be used by detection circuitry to decide that a communication instability exists (e.g., that communication is not stable and that a risk of a dropped call exists). In such an example, detection circuitry may also receive other types of information, such as, for example, battery related information. As an example, information may be available to detection circuitry as to a cell site or cell sites. For example, where a hand-off is imminent from one cell site to another cell site, optionally processing in parallel both cell sites in preparation for a hand-off, such information may trigger an analysis by detection circuitry to decide whether the hand-off is possible, is expected to be stable, etc. As explained, detection circuitry may receive different types of information and decide whether a communication instability exists based at least in part on one or more of the different types of information.

As an example, detection circuitry may receive information germane to power level of a battery, optionally via an API of an operating system of a phone. For example, consider a Get Battery Status API call in an iOS operating system environment that can return a battery level. As an example, in an ANDROID® operating system environment, a BatteryManager public class may be used to access battery related information (e.g., consider EXTRA_LEVEL to return the current battery level).

As an example, an allied device (see, e.g., the devices 496, 497 and 498 of FIG. 4) may include circuitry that can make one or more API calls to an operating system environment of another device, for example, to receive information in response to the one or more API calls. As an example, such a call may be for a battery level. In such an example, an allied device may commence recording of audio where a battery level is below a threshold level that may, for example, put a call at risk of being dropped.

As an example, a device may be operatively coupled to a phone and include circuitry that can receive power related information about the phone. For example, consider a "smart watch" that includes circuitry that can be operatively coupled to a phone. In such an example, where a user relies on a microphone of the smart watch and where the phone loses power and drops a call, the smart watch may continue to record audio where the user continues to speak. Thus, depending on the type of scenario, power level of a battery of a phone of a user may be germane to making decisions as to whether a communication instability exists and, in response thereto, to record audio. A wearable device can set up such a scenario as a user may have his or her phone in a pocket, etc. Such a scenario may arise where one or more types of "headsets" are in use. For example, such a scenario may arise in a vehicle with a "hands-free" type of device that operatively couples to a phone (e.g., which may be in a glove-compartment or other compartment in the vehicle, etc.). As an example, a device may be part of a vehicle that can record audio in response to detection of a communication instability.

A dropped call can occur for one or more reasons. As an example, a dropped call may be an "abnormal release". As mentioned, a dropped call is a type of communication instability.

As an example, a dropped call may occur when a phone moves out of range of a cell site or cell sites (e.g., outside of a network). As an example, an active call may not be maintained across a different company's network (e.g., as calls cannot be re-routed over a phone network while in progress), which may result in the termination of a call once a signal cannot be maintained between the phone and the original network.

As an example, a dropped call may occur when a phone is taken into an area where wireless communication is unavailable, interrupted, interfered with, or jammed. From a network's perspective, this may be akin to a phone moving out of a coverage area.

As an example, a call may be dropped upon hand-off between cell sites (e.g., between "cells") within a provider's network. This may be due to an imbalance of traffic between the two cell sites' areas of coverage. If the new cell site is at capacity, it cannot accept the additional traffic of the call trying to "hand in". It may also be due to the network configuration not being set up properly, such that one cell site is not "aware" of the cell site to which the phone is trying to hand-off. If the phone cannot find an alternative cell site to which to move that can take over the call, the call can be lost.

As an example, co-channel and adjacent-channel interference may be responsible for dropped calls in a wireless network. As an example, neighboring cell sites with the same frequencies can interfere with each other, deteriorating the quality of service and producing dropped calls. As an example, another problem may be a faulty transceiver inside the base station.

As an example, a call can be dropped if a phone at the other end of a call loses battery power and stops transmitting abruptly.

Figure 6:
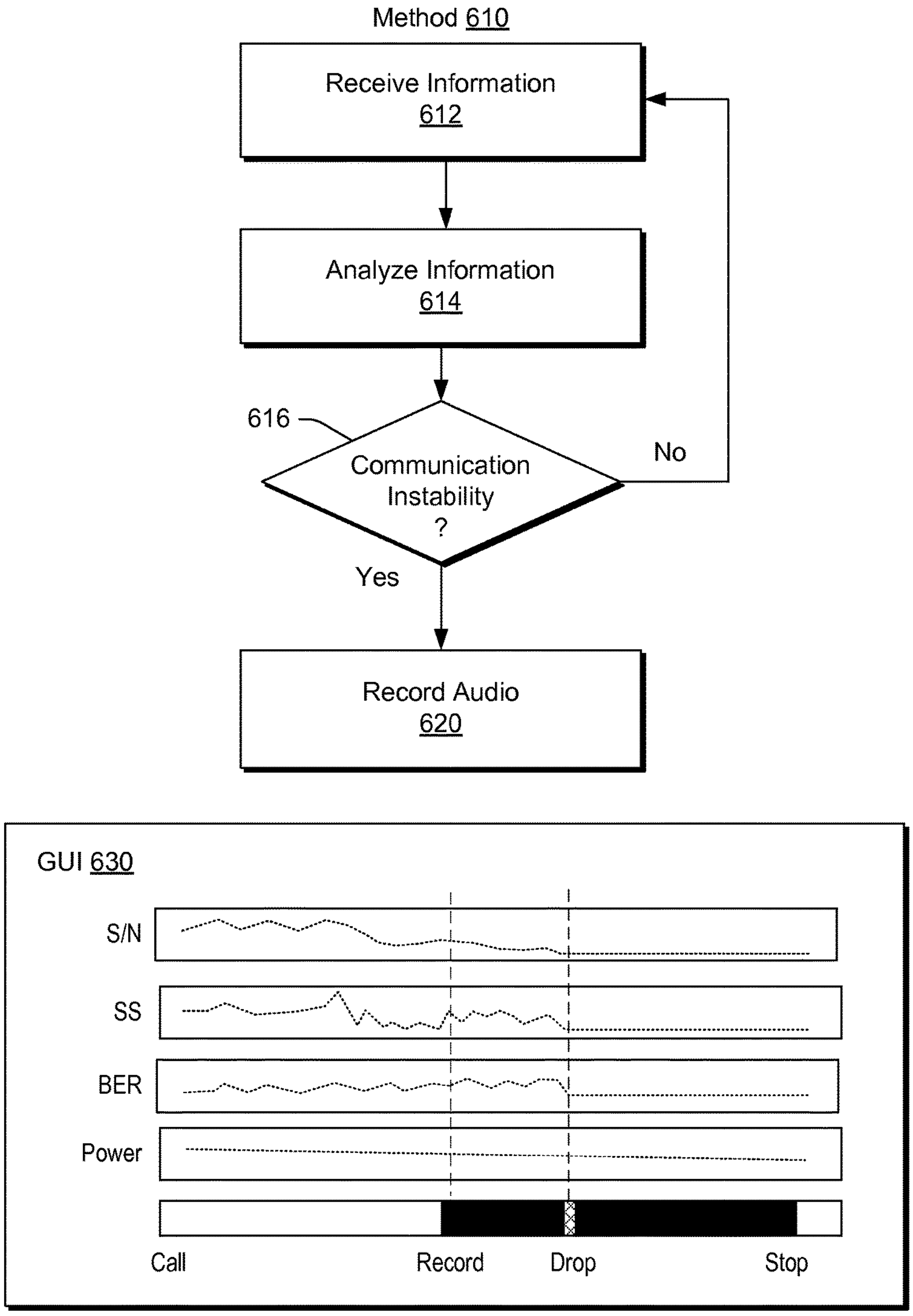
FIG. 6 is a diagram of an example of a method and an example of a graphical user interface.

FIG. 6 shows an example of a method 610 that includes a reception block 612 for receiving information, an analysis block 614 for analyzing at least a portion of the received information, a decision block 616 for deciding if a communication instability exists based at least in part on an analysis of the analysis block 614 and a record block 620 for recording audio where the decision block 616 decides that a communication instability exists. As shown in FIG. 6, where the decision block 616 decides that a communication instability does not exist (e.g., based on one or more criteria), then the method 610 continues, for example, at the reception block 612.

FIG. 6 also shows an example of a graphical user interface 630 that includes one or more types of information that may be received and part of an analysis. For example, the GUI 630 includes a plot of signal to noise ratio values, a plot of signal strength values, a plot of bit error rate values and a plot of power level values. Also included in the GUI 630 is a time line that includes a left side marker that corresponds to a time that a call began, a marker for when recording commenced, a marker for when a call was dropped and a marker for when the recording terminated (see, e.g., the method 710 of FIG. 7).

As an example, one or more of the types of information may be used to decide that a communication instability exists. As illustrated in the GUI 630, recording may commence prior to the actual dropping of a call (e.g., abnormal release). As an example, a dropped call may be due to loss of power at a phone on another end of a call. As shown in the GUI 630, the plot of power level versus time may indicate to a user that his or her device had sufficient power to operate communication circuitry appropriately and, hence, power of the device of the user was not a cause of the communication instability. As an example, a device may have power at a level sufficient to operate recording circuitry where the power level may be insufficient to maintain a reliable network connection.

As an example, where a user relies on another device (e.g., an allied device) that is operatively coupled to a phone, for example, a wearable device (e.g., a watch, a headset, etc.), if that device includes circuitry that can perform a method such as the method 610, a recording of audio may be made even where the user's phone has lost power and is a cause communication instability (e.g., a dropped call). Thus, in the example GUI 630, the power level plot may show a phone power level that drops, for example, to a baseline value.

As an example, an analysis may include comparing one or more types of information, which may be numeric values, to one or more criteria. Such an analysis may consider time. For example, where a pattern exists with respect to time, one or more statistical techniques may be applied to determine whether the pattern is evidence of a communication instability. Such a pattern may be a signal strength pattern, a signal to noise ratio pattern, a bit error rate pattern, etc. As an example, where a pattern persists for a period of time (e.g., per a time window parameter), a decision may be made that the pattern is evidence of a communication instability that rises to a level that triggers recording of audio. For example, if a signal to noise ratio pattern of high and low values persists for more than several seconds, recording of audio may commence. Such an approach may be taken for signal strength patterns, bit error rate patterns, a combination of patterns, etc.

Figure 7:
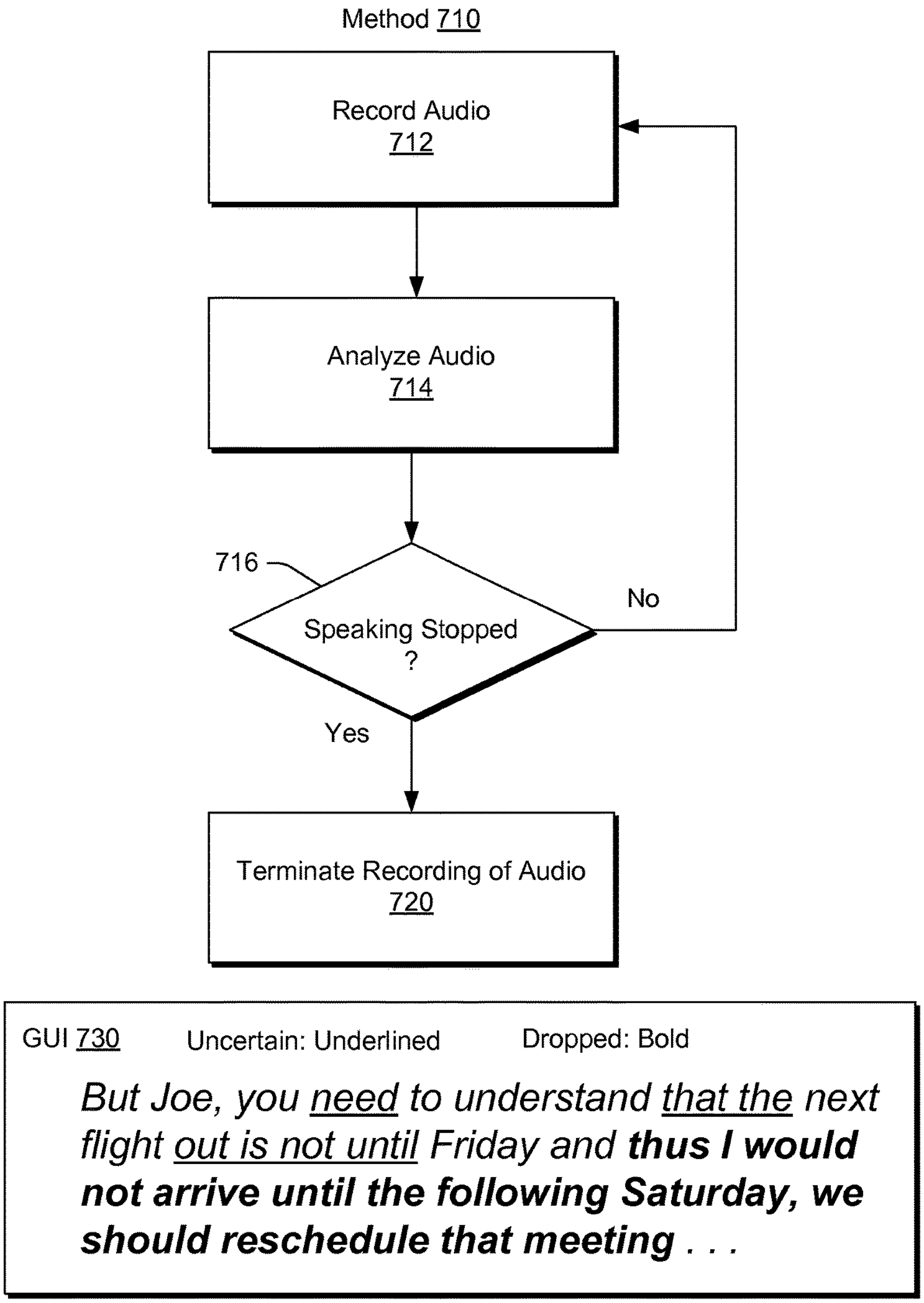
FIG. 7 is a diagram of an example of a method and an example of a graphical user interface.

FIG. 7 shows an example of a method 710 that includes a record block 712 for recording audio (see, e.g., the record block 620 of FIG. 6), an analysis block 714 for analyzing at least a portion of the audio (e.g., audio signals at a microphone, an amplifier, as recorded, etc.), a decision block 716 for deciding if a speaker has stopped speaking (e.g., audio at a microphone or associated circuitry has decreased in sound level, etc.) based at least in part on an analysis of the analysis block 714 and a termination block 720 for terminating the recording of audio where the decision block 716 decides that the speaker has stopped speaking. As shown in FIG. 7, where the decision block 716 decides that a speaker has not stopped speaking (e.g., based on one or more criteria), then the method 710 continues, for example, at the record block 712 to continue recording audio.

As an example, the method 710 may continue at a transmission block that, after termination of recording of the audio per the termination block 720, provides for transmitting recorded audio. As an example, a method can include converting audio to text and, for example, transmitting text. As an example, recorded audio and/or text may optionally be transmitted at least in part via a network that differs from a network of a dropped call. As an example, recorded audio and/or text may optionally be transmitted at least in part via a network that includes a network of a dropped call.

As an example, a method can include tagging audio and/or text in combination with one or more communication instability metrics (e.g., instability rating from 0 to 10, where 10 is a dropped call). As an example, a graphical user interface may include a time line of audio and/or text and instability to determine what text (e.g., even is sporadic) was likely subject to corruption, miscommunication, etc. As an example, a method may include performing an "information theory" type of analysis. For example, consider an analysis that determines, on average, that a number of bits needed to represent the result of an uncertain event is given by its entropy. In such an example, a noisy-channel coding approach may indicate that reliable communication is possible over noisy channels provided that the rate of communication is below a certain threshold (e.g., a channel capacity). As an example, a method can include demarcating text to indicate what words, phrases, etc. were at risk of being dropped or that were actually dropped.

FIG. 7 also shows an example of a graphical user interface 730 that includes text that is demarcated as to being uncertain (underlined) and certain (bold) as to its communication status. For example, one or more metrics of communication instabilities may be linked to audio and/or text and used to convey information. A user reviewing the information in the GUI 730 may use the information upon calling again, receiving a call, transmitting a text message, etc. The GUI 730 demonstrates how one or more metrics of uncertainty of communicated information (e.g., and certainty as to information not being communicated) may be presented to a display. For example, a user, upon viewing the GUI 730, may consider that the other party or parties, at best, hear "But Joe, you need to understand that the next flight out is not until Friday and"; and that possibly all that may have been heard was: "But Joe, you __________ to understand __________ next flight __________ Friday and". Such information may help to improve communication and help to avoid speculative assumptions as to what another party may have heard.

Figure 8:
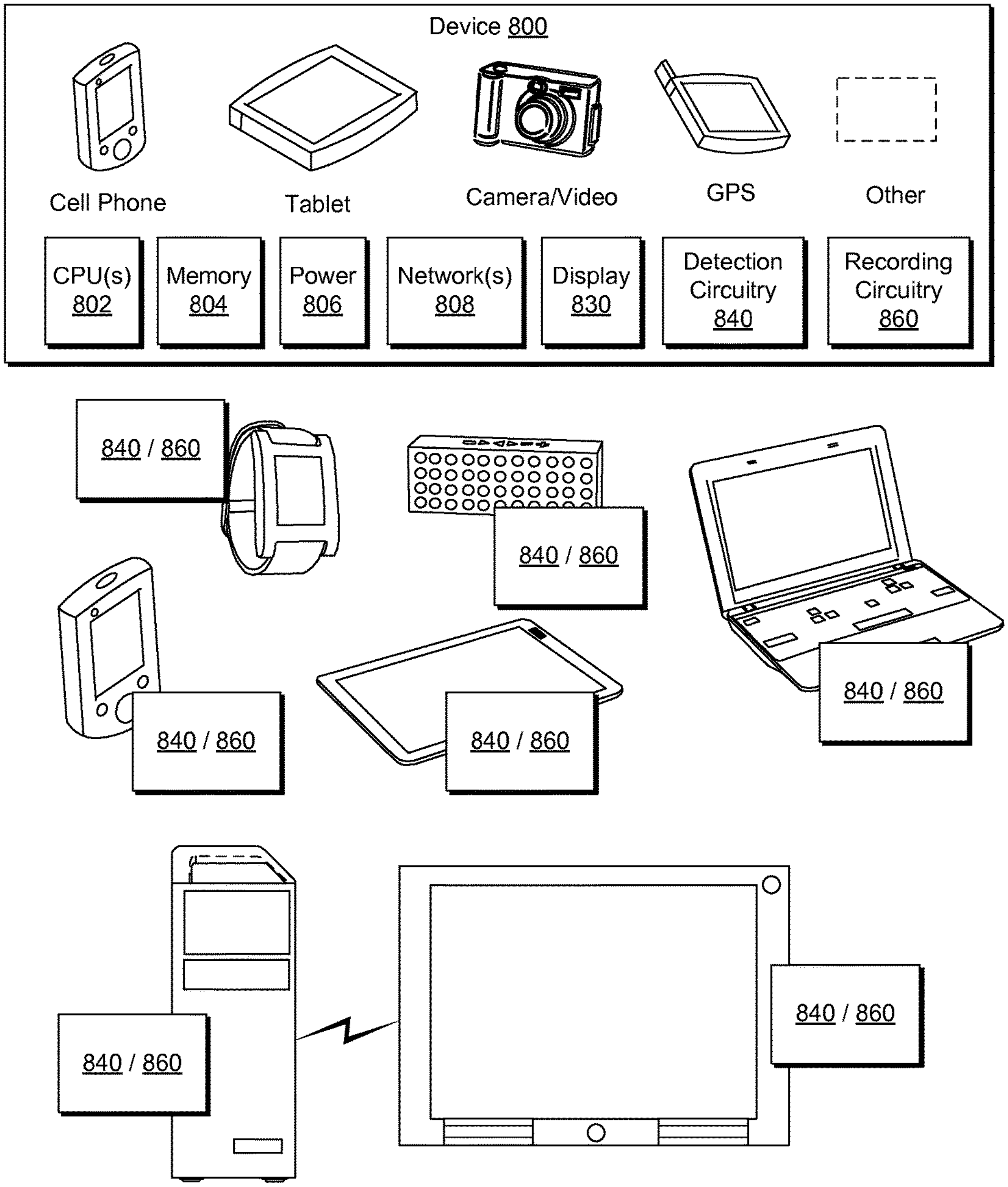
FIG. 8 is a diagram of examples of devices.

FIG. 8 shows an example of a device 800 that may include detection circuitry 840 and recording circuitry 860. As shown, the device 800 may be configured, for example, as a watch, a wired or a wireless speaker, a phone, a tablet, a notebook, a desktop system, a camera, a GPS device or other device.

As an example, the device 800 may include one or more processors 802, memory 804, a power source 806, one or more network interfaces 808 (e.g., including one or more cell network interfaces, etc.), a display 830 (e.g., or displays), detection circuitry 840 and recording circuitry 860, which may include a microphone or microphones or be operatively coupled to one or more microphones (e.g., via wire or via wireless technology). As an example, audio and volume circuitry 850 may be operatively coupled to a processor, may include a processor, etc. As an example, the detection circuitry 840 and the record circuitry 860 may be configured for detecting a communication instability (e.g., as associated with a network) and recording audio.

As an example, a wearable device may be a watch or of another wearable form. As an example, such a device may be a phone or include circuitry that can operatively couple the device to a phone. For example, consider a BLUETOOTH® connection between a wearable and a phone. In such an example, the wearable may include detection circuitry and/or recording circuitry. As an example, a wearable may receive a signal, a command, etc. from a phone to record audio, for example, where the wearable may include a microphone being used for purposes of voice communication. In such an example, the phone may include detection circuitry that detects a communication instability and that transmits a signal, a command, etc. to the wearable for recording audio.

As an example, audio may be recorded by a wearable and/or a phone. As an example, detection of a communication instability may occur by a wearable and/or a phone. As an example, during a communication instability and thereafter, a connection (e.g., wired or wireless) may be maintained between a wearable and a phone. In such an example, the wearable and/or the phone may record audio. A decision as to where to record audio may depend on location of a microphone or microphones with respect to a speaker. For example, where a speaker (user) is using a microphone of a wearable, recording of audio may occur at the wearable via recording circuitry of the wearable. Or, for example, the audio received by the microphone of the wearable may be transmitted to the phone and recorded by recording circuitry of the phone. Where a speaker is using a microphone of a phone, as an example, audio may be recorded by recording circuitry of the phone or, for example, audio may be transmitted to a wearable for recording of the audio by the wearable (e.g., wearable device).

As an example, an apparatus can include a phone that includes communication circuitry, detection circuitry that detects a communication instability, and recording circuitry that records audio responsive to detection of a communication instability. In such an example, the recording circuitry can record local audio. As an example, recording circuitry may store recorded audio as an audio file.

As an example, communication circuitry can include cellular network communication circuitry and/or Internet communication circuitry.

As an example, an apparatus can include audio to text circuitry that converts received and/or recorded audio to text. In such an example, the apparatus can include text communication circuitry that transmits the text to at least one specified address (e.g., email address, SKYPE® name, IM ID, etc.). As an example, an apparatus can include text communication circuitry that transmits text to at least one specified telephone number where the text is text stemming from audio (e.g., as converted from audio to text).

As an example, detection circuitry can issue a notification responsive to detection of an audio communication instability that is a disconnection (e.g., a dropped call).

As an example, a method can include transmitting audio via communication circuitry of a device; detecting a communication instability; and, responsive to detection of the communication instability, recording audio via recording circuitry of the device. In such an example, the method may include storing the recorded audio as an audio file. As an example, a method may include converting audio to text and, for example, transmitting the text to at least one specified address.

As an example, a communication instability can be a wireless network instability. As an example, a wireless network can be a wireless cellular network. As an example, a wireless network may be a wireless IP address-based network.

As an example, one or more computer-readable storage media can include processor-executable instructions where the instructions include instructions to detect a communication instability; and, responsive to detection of the communication instability, issue a signal for recording audio. In such an example, the communication instability can be a network instability. As an example, a communication instability can be an end-point, device-based instability. As an example, one or more computer-readable storage media can include instructions to record audio responsive to receipt of a signal for recording audio.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium or a machine-readable medium may be a storage device (e.g., a memory card, a storage disk, etc.) and referred to as a computer-readable storage medium or a machine-readable storage medium that is not a carrier wave (e.g., a non-transitory medium).

Figure 9:
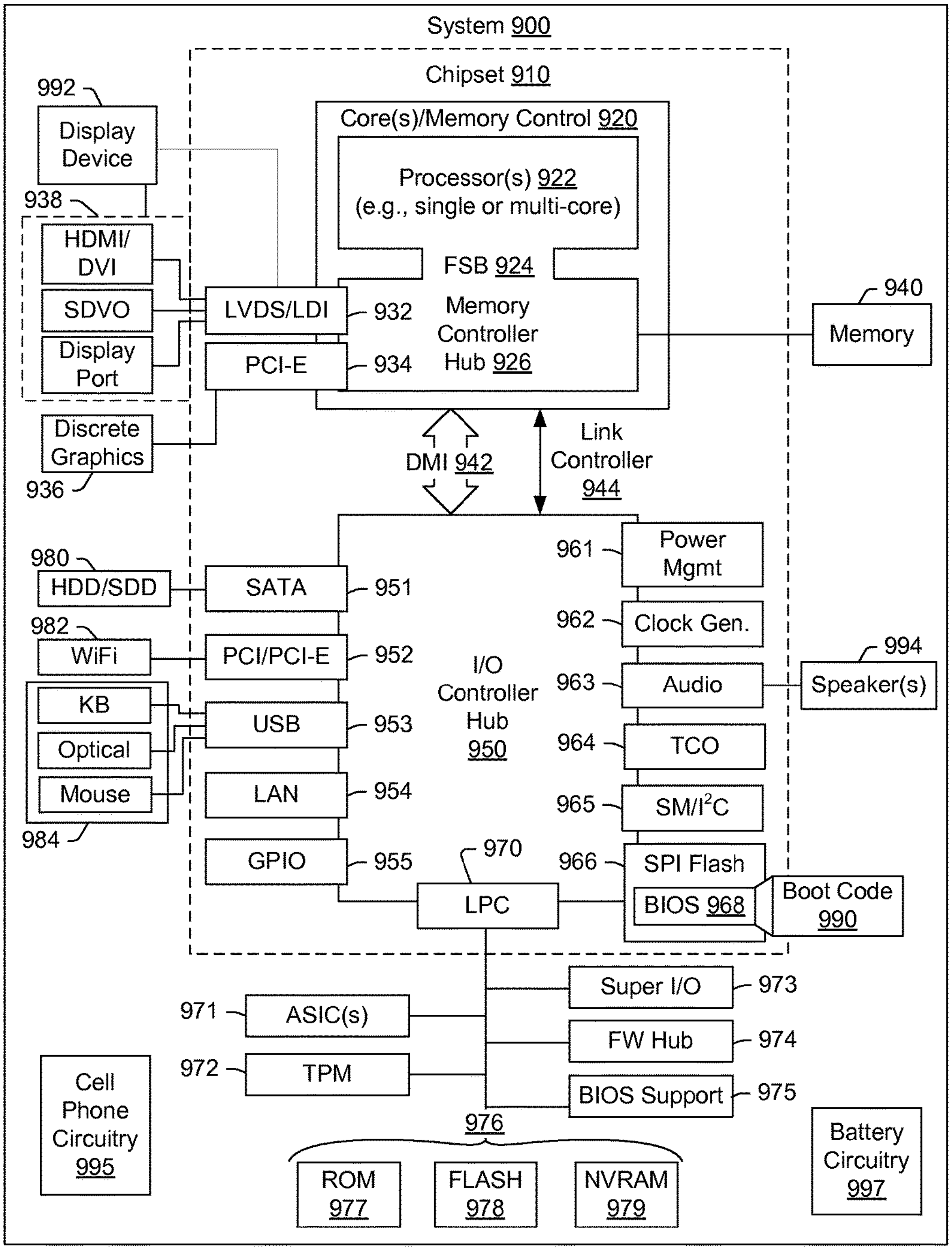
FIG. 9 is a diagram of an example of a system.

While various examples of circuits or circuitry have been discussed, FIG. 9 depicts a block diagram of an illustrative computing system 900. As an example, the system 900 may be a system of components that may be included in a device. The system 900 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a satellite, a base, a server or other machine may include other features or only some of the features of the system 900. As described herein, a device (see, e.g., the device 110, the device 310, etc.) may include at least some of the features of the system 900.

As shown in FIG. 9, the system 900 includes a so-called chipset 910. A chipset refers to a group of integrated circuits, or chips, that are designed to work together. Chipsets are usually marketed as a single product (e.g., consider chipsets marketed under the brands INTEL®, AMD®, etc.).

In the example of FIG. 9, the chipset 910 has a particular architecture, which may vary to some extent depending on brand or manufacturer. The architecture of the chipset 910 includes a core and memory control group 920 and an I/O controller hub 950 that exchange information (e.g., data, signals, commands, etc.) via, for example, a direct management interface or direct media interface (DMI) 942 or a link controller 944. In the example of FIG. 9, the DMI 942 is a chip-to-chip interface (sometimes referred to as being a link between a "northbridge" and a "southbridge").

The core and memory control group 920 include one or more processors 922 (e.g., single core or multi-core) and a memory controller hub 926 that exchange information via a front side bus (FSB) 924. As described herein, various components of the core and memory control group 920 may be integrated onto a single processor die, for example, to make a chip that supplants the conventional "northbridge" style architecture. As an example, a chipset may be configured as a platform controller hub (PCH), for example, the memory controller hub (MCH) 926 may be considered a northbridge and the I/O controller hub (ICH) 950 may be considered a southbridge where the MCH 926 and the ICH 950 may be components of the platform controller hub (PCH) (e.g., a PCH architecture).

As shown in FIG. 9, the memory controller hub 926 interfaces with memory 940. For example, the memory controller hub 926 may provide support for DDR SDRAM memory (e.g., DDR, DDR2, DDR3, etc.). In general, the memory 940 is a type of random-access memory (RAM). It is often referred to as "system memory". As an example, one or more processors may include circuitry for memory access, for example, to access system memory.

The memory controller hub 926 further includes a low-voltage differential signaling interface (LVDS) 932. The LVDS 932 may be a so-called LVDS Display Interface (LDI) for support of a display device 992 (e.g., a CRT, a flat panel, a projector, etc.). A block 938 includes some examples of technologies that may be supported via the LVDS interface 932 (e.g., serial digital video, HDMI/DVI, display port). The memory controller hub 926 also includes one or more PCI-express interfaces (PCI-E) 934, for example, for support of discrete graphics 936. Discrete graphics using a PCI-E interface has become an alternative approach to an accelerated graphics port (AGP). For example, the memory controller hub 926 may include a 16-lane (×16) PCI-E port for an external PCI-E-based graphics card. A system may include AGP or PCI-E for support of graphics (e.g., rendering of graphics to a display, etc.).

The I/O controller hub 950 includes a variety of interfaces. The example of FIG. 9 includes a SATA interface 951, one or more PCI-E interfaces 952 (optionally one or more legacy PCI interfaces), one or more USB interfaces 953, a LAN interface 954 (more generally a network interface), a general purpose I/O interface (GPIO) 955, a low-pin count (LPC) interface 970, a power management interface 961, a clock generator interface 962, an audio interface 963 (e.g., for speakers 994), a total cost of operation (TCO) interface 964, a system management bus interface (e.g., a multi-master serial computer bus interface) 965, and a serial peripheral flash memory/controller interface (SPI Flash) 966, which, in the example of FIG. 9, includes BIOS 968 and boot code 990. With respect to network connections, the I/O controller hub 950 may include integrated gigabit Ethernet controller lines multiplexed with a PCI-E interface port. Other network features may operate independent of a PCI-E interface.

The interfaces of the I/O controller hub 950 provide for communication with various devices, networks, etc. For example, the SATA interface 951 provides for reading, writing or reading and writing information on one or more drives 980 such as HDDs, SDDs or a combination thereof. The I/O controller hub 950 may also include an advanced host controller interface (AHCI) to support one or more drives 980. The PCI-E interface 952 allows for wireless connections 982 to devices, networks, etc. The USB interface 953 provides for input devices 984 such as keyboards (KB), one or more optical sensors, a touchpad, mice and various other devices (e.g., cameras, phones, storage, media players, etc.). On or more other types of sensors may optionally rely on the USB interface 953 or another interface (e.g., $I^2C$, etc.).

In the example of FIG. 9, the LPC interface 970 provides for use of one or more ASICs 971, a trusted platform module (TPM) 972, a super I/O 973, a firmware hub 974, BIOS support 975 as well as various types of memory 976 such as ROM 977, Flash 978, and non-volatile RAM (NVRAM) 979. With respect to the TPM 972, this module may be in the form of a chip that can be used to authenticate software and hardware devices. For example, a TPM may be capable of performing platform authentication and may be used to verify that a system seeking access is the expected system.

The system 900, upon power on, may be configured to execute boot code 990 for the BIOS 968, as stored within the SPI Flash 966, and thereafter processes data under the control of one or more operating systems and application software (e.g., stored in system memory 940). An operating system may be stored in any of a variety of locations and accessed, for example, according to instructions of the BIOS 968.

Again, as described herein, a satellite, a base, a server or other machine may include fewer or more features than shown in the system 900 of FIG. 9. Further, the system 900 of FIG. 9 is shown as including cell phone circuitry 995, which may include GSM, CDMA, etc., types of circuitry configured for coordinated operation with one or more of the other features of the system 900. Also shown in FIG. 9 is battery circuitry 997, which may provide one or more battery, power, etc., associated features (e.g., optionally to instruct one or more other components of the system 900). As an example, a SMBus may be operable via a LPC (see, e.g., the LPC interface 970), via an $I^2C$ interface (see, e.g., the SM/$I^2C$ interface 965), etc.

CONCLUSION

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. An apparatus comprising:

an allied device that operatively couples to a phone that comprises communication circuitry, wherein the allied device comprises a microphone, detection circuitry that detects a communication instability, and recording circuitry that records audio via the microphone responsive to detection of a communication instability and wherein the communication instability comprises a disconnection due to loss of power of the phone.

2. The apparatus of claim 1 wherein the recording circuitry records local audio that is local to the phone and the allied device.

3. The apparatus of claim 1 wherein the recording circuitry stores the recorded audio as an audio file.

4. The apparatus of claim 1 wherein the detection circuitry issues a notification responsive to detection of a communication instability that comprises the disconnection due to loss of power of the phone.

5. The apparatus of claim 1 wherein the allied device comprises a watch.

6. The apparatus of claim 1 wherein the allied device comprises a headset.

7. The apparatus of claim 1 wherein the allied device comprises a part of a vehicle.

8. The apparatus of claim 1 wherein the allied device operatively couples to the phone via wires.

9. The apparatus of claim 1 wherein the allied device operatively couples to the phone wirelessly.

10. The apparatus of claim 1 wherein the allied device operatively couples to the phone via BLUETOOTH® circuitry.

11. The apparatus of claim 1 wherein the allied device comprises a battery.

12. A method comprising:

operatively coupling an allied device to a phone wherein the allied device comprises a microphone and recording circuitry;

transmitting audio via communication circuitry of the phone;

detecting a communication instability that comprises a disconnection due to loss of power of the phone; and responsive to detection of the communication instability, recording audio via the microphone and the recording circuitry of the allied device.

13. The method of claim 12 further comprising storing the recorded audio as an audio file.

14. The method of claim 12 wherein the detecting comprises transmitting a request for information germane to a power level of the phone and, in response to the request, receiving the information germane to the power level of the phone.

15. The method of claim 14 wherein the request comprises an application programming interface call.

16. One or more computer-readable storage media comprising processor-executable instructions wherein the instructions comprise instructions to:

operatively couple an allied device to a phone;

detect, at least in part via detection circuitry of the allied device, a battery level of the phone wherein the battery level is below a threshold level associated with communication instability, wherein the communication instability comprises a disconnection due to loss of power of the phone; and responsive to detection of the battery level, issue a signal for recording audio via a microphone of the allied device.

* * * * *